United States Patent [19]
Delmonte

[11] Patent Number: 5,595,137
[45] Date of Patent: Jan. 21, 1997

[54] WIND INDICATOR

[76] Inventor: Anthony W. Delmonte, 1173 Lovejoy St., Buffalo, N.Y. 14206

[21] Appl. No.: 366,966

[22] Filed: Dec. 30, 1994

[51] Int. Cl.$^6$ ................................................ G01P 13/02
[52] U.S. Cl. ................................. 116/264; 73/170.01
[58] Field of Search ........................ 43/1; 73/170.01, 73/170.04, 170.05; 116/214, 209, 175, 264, 265, 273

[56] References Cited

U.S. PATENT DOCUMENTS

| | | | |
|---|---|---|---|
| 792,944 | 6/1905 | Stow | 33/392 X |
| 3,418,852 | 12/1968 | Martin | 73/170.04 |
| 4,523,717 | 6/1985 | Schwab | 43/2 X |
| 4,850,798 | 7/1989 | Bailey | 73/170.05 X |
| 4,860,477 | 8/1989 | Gooch | 40/617 X |
| 5,065,622 | 11/1991 | Veenstra | 73/170.05 |
| 5,291,778 | 3/1994 | Dexheimer et al. | 43/1 X |
| 5,349,920 | 9/1994 | Koizumi | 116/209 X |

*Primary Examiner*—William A. Cuchlinski, Jr.
*Assistant Examiner*—Willie Morris Worth
*Attorney, Agent, or Firm*—James R. Ralabate

[57] ABSTRACT

The wind detector contains a freely movable main section that has wings which will respond to a wind current. The detector is small and light weight so that it will fit into the pocket of a hunter. In addition to having an ability to show wind direction, the detector has a scent container that contains a scent which will mask the hunter's scent and emit a scent attractive to a hunted animal.

15 Claims, 2 Drawing Sheets

WIND INDICATOR

This invention relates to a wind indicator or detector and, more specifically, to a device useful to hunters to determine wind direction.

BACKGROUND OF THE INVENTION

It is important for hunters to carefully select their position especially taking into account the wind direction at that time. Game such as deer have a keen sense of smell and can easily detect the presence of the hunter thus avoiding adjacent territories. Game downwind from a hunter will avoid the hunter's location. Therefore, it is important for the hunter to select a stalking or waiting location downwind to avoid detection. Also, wind direction is important to bow hunters who need to gauge windage that an arrow will encounter when shot toward a target or animal. The wind will have a definite effect upon the trajectory of an arrow.

Also, hunters have used various odors to attract animals during a hunt. These odors are used both to conceal the hunter's scent and also to attract deer or other animals. These scents usually are strong and should be provided by means that do not contaminate the clothing or person of the hunter.

Various wind detectors and odor dispensers used by sportsmen have been known and used such as those disclosed in U.S. Pat. Nos. 3,845,734; 5,065,622 and 5,186,118. In U.S. Pat. No. 3,845,734 (Demos) a wind detector useful on a sailboat is disclosed. While adapted for use on a boat, Demos' device is too large to be carried by a hunter, is complicated and is required to be attached to a boat near the forward edge of the sail. Demo' winged wind detector has a substantially side view triangular configuration and is attached to a support means at its peak section for horizontal movement. A hunter would have a difficult time using the Demos device because of its weight, complex configuration and horizontal functionality. In addition, the Demos device would be too expensive for use by the average hunter. In U.S. Pat. No. 5,065,622 (Veenstra) a wind detector having a tail on one end formed by diverging feather segments is disclosed. The tail is located on a rod or beam that is rotational or rotatable upon a pin. The pin has an attachment means such as a standard alligator clip for attachment to a tree branch or the like. The Veenstra detector is too large to fit into the hunter's pocket and must be housed and carried in a case such as that shown in Veenstra's FIG. 4. A hunter must carry enough gear and the requirement of an additional carry case of Veenstra's detector would be inconvenient and burdensome. In U.S. Pat. No. 5,186,118 issued to Stinson, a wind-guaging method for use by hunters is disclosed which involves the use of a dispensing bottle containing visible powder. The hunter will disperse the powder into the air to create a wind-borne cloud for gauging the wind direction and velocity. The powder can also be used as a dispersed scent to attract animals to the desired location. When the powder is dispersed by the hunter, air currents will carry the low-density particles over large distances before they finally settle out and fall to earth. The floating scent trail attracts animals to the hunter's position. There is always the possibility that this odor will permeate the hunter's clothing or person. Also, the accuracy of a fine powder cloud may be somewhat misleading to the hunter, especially during strong windy conditions. In addition, the expense of a frequently dispensed and used wind detection means may become significant.

There are also several known systems for dispensing scents or odors to attract wild game such as those disclosed in U.S. Pat. No. 3,046,192 (Bilyeu); U.S. Pat. No. 4,186,502 (Foster); U.S. Pat. No. 4,722,477 (Floyd) and U.S. Pat. No. 4,802,626 (Forbes). In Bilyeu, a metallic container having apertures is filled with a lure scent composition comprising musk and animal urine. The container is then hung onto a tree or other structure so that the odor can escape from the apertures in the container to attract the animal. In Foster U.S. Pat. No. 4,186,502, a scent-dispensing means comprising an absorbent pad held within a pocket of a boot is disclosed. The pocket has ventilating means for communicating the scent to the air. The pad is resilient and the pocket is located above the heel in the backstrap so it flexes as the wearer walks. As in the other scent-dispensing means, the hunter's intention is to mask his own scent while providing one that will attract animals. Since the compositions providing these scents commonly contain ingredients such as animal urine, it would be preferable to use a dispensing device that would not come into contact with the hunter's clothing or body. U.S. Pat. No. 4,722,477 (Floyd) and U.S. Pat. No. 4,802,626 (Forbes) both disclose devices that emit animal-attracting scents. Floyd discloses a scent dispenser that is worn by the hunter as a strap while Forbes discloses a device that can be attached to a person or to foliage. These devices are wafers that can be stacked one over the other or can be used singularly.

In all of the above as with the present invention, scents such as urine, sex scents, food scents and musk can be used. Any of the scents disclosed in each of the above patents will function in the present invention.

SUMMARY OF THE INVENTION

It is therefore an object of this invention to provide a combination wind detector-scent dispenser devoid of the above-noted disadvantages.

Another object of this invention is to provide an apparatus for wind detection that is easy to carry, lightweight and compact.

A further object of this invention is to provide a wind detector that will point in the direction of the wind when used.

Yet a further object of this invention is to provide a simply-constructed, easy to use wind detector that can be hung or suspended from any available structure such as foliage or a tree limb and the like.

Another further object of this invention is to provide a wind detector that will react to even the slightest breezes as well as strong winds.

Another still further object of this invention is to provide a simple structure that can be carried in the pocket of a hunter, that will detect wind direction and dispense animal-attracting scents.

Still a further object of this invention is to provide a scent dispenser to attract animals that will not contaminate the hunter's clothing when in use.

Yet still another object of this invention is to provide a wind detector made from inexpensive, readily available materials and has a configuration that is extremely sensitive to wind movement and direction.

Yet a further object of this invention is to provide a wind detector having an easy, swivel construction that will easily move according to wind direction.

These and other objects are accomplished in accordance with this invention by a wind detector that is small enough to fit into a hunter's pocket yet accurate enough to be hung on any structure to determine the precise wind direction. Included in this device is a small compartment containing an absorbent material that will hold various animal-related scents. In a preferred embodiment a construction is used where between the winged-like vane and the scent compartment is located a swivel means that allows the winged vane to easily move in the direction of the wind. However, the scent compartment can be located anywhere in the device that is suitable. The vane is substantially triangular shaped when viewed from a side perspective with the point or peak portion pointing downwardly as the wind detector is used and suspended from a tree or other structure. The wider portion of the winged vane is connected to a wire, string or cord that is used to hang the wind detector from a structure. At the upper portion of the wind detector structure is a small compartment into which a scented composition can be deposited. The winged vane can be constructed of any suitable material such as paper products, lightweight plastics, light woods, lightweight metals or mixtures thereof. The swivel allows the wind detector the ability to move freely when air current hits it. The smoother the swivel is the easier the wind detector will move to indicate air current direction. Suitable swivels are available from Leeding Sales Co. Inc., 242 West 36th St, New York, N.Y. 10018; Bead Tackle, Inc., 600 Main St. Monroe, Conn. 06468; Ball Chain Mfg. Co., Inc., 741 S. Fulton Ave., Mt. Vernon, N.Y. 10550; Rosco Terminal Tackle (Div. of Rome Specialty Co., Inc. and SAMPO (Div. of Rosco), 501 W. Embargo St., Box 109-B, Rome, N.Y. 13440 Size N/S-4# and Barrel Swivel Size 12 #16005P-12 made by Danielson Co., Kent, Wash. 98064. With the present invention the hunter can calculate approximately when the game will have a chance to "wind" the hunter. Thus, the hunter may take a shot just before this can occur. If the hunter waits, he may not get a shot as the game will "wind" the hunter and then clear out.

While the wind-detecting device of this invention is primarily intended for use by hunters, it can be used for any other purpose such as by wind surfers, golfers, archers, target shooters and the like.

Various lure scents can be used in the wind detector of this invention. Such scents are available from:

Wildlife Research Center, Inc.

Buckstop Lure Co., Inc.

Scrape Juice Inc.

Deer Run Products Inc.

Lee's Pure Deer Urine Co.

Mighty Deer Lick Inc.

H. S. Scents (division of Hunter's Specialties)

Sugar Creek Outfitters, Inc.

Robinson Laboratories, Inc.

Wellington Outdoors

Pete Rickard Inc.

Martine's Deer Scents

The shape of the vane has preferably a winged-like construction, however, any construction wherein flat surfaces are on the outside faces and air-catching surfaces are in the opposite inside faces to catch air current would function; any suitable construction would be included in this invention. For best results, however, a winged-like vane is preferred wherein the tip or pointed portion points downwardly at a terminal end opposite to the terminal end connected to a suspension means such as a wire, cord or the like. Thus, when vertically suspended and in use, the wind detector of this invention has its wider portion adjacent the suspension cord and scent compartment; its narrower tip portion farthest from the suspension cord and scent compartment and pointing downwardly. The folded, wing-like structure of the wind detector forms an inner section that resembles a scoop configuration which catches the wind and orients the vane accordingly. If desirable, the scent-detecting device may be omitted from the present structure depending upon the immediate needs of the user.

DESCRIPTION OF THE DRAWINGS AND PREFERRED EMBODIMENTS

Figure 1:
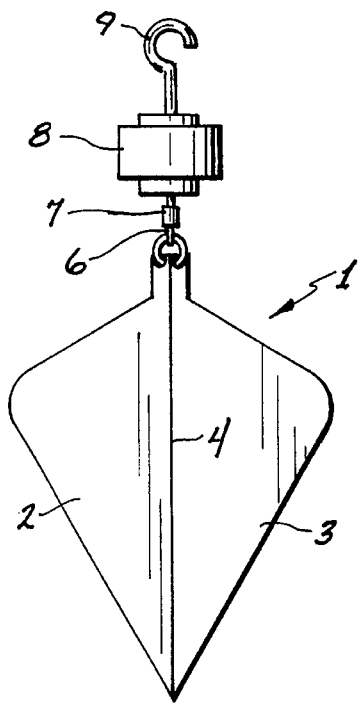
FIG. 1 is a front outside plan view of the wind detector of this invention.
Figure 2:
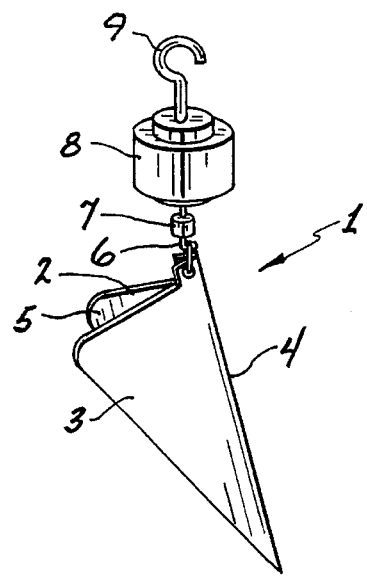
FIG. 2 is a side perspective outside view of the wind detector of this invention.
Figure 3:
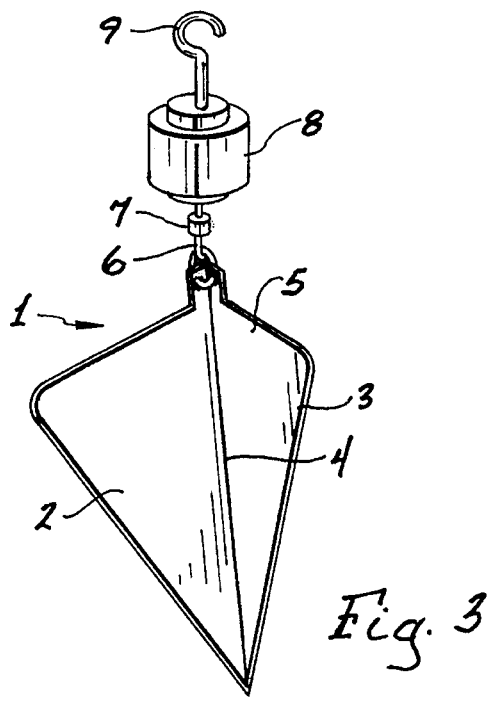
FIG. 3 is a side perspective inside view of the wind detector of this invention.
Figure 4:
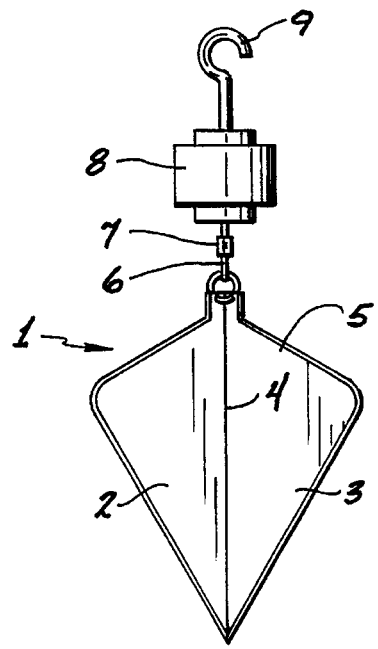
FIG. 4 is a back inside plan view of the wind detector of this invention.
Figure 5:
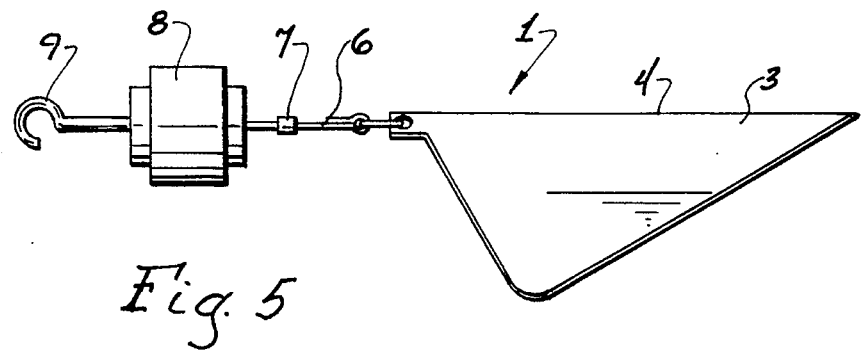
FIG. 5 is a side outside plan view of the wind detector of this invention having the winged sections facing downwardly.
Figure 6:
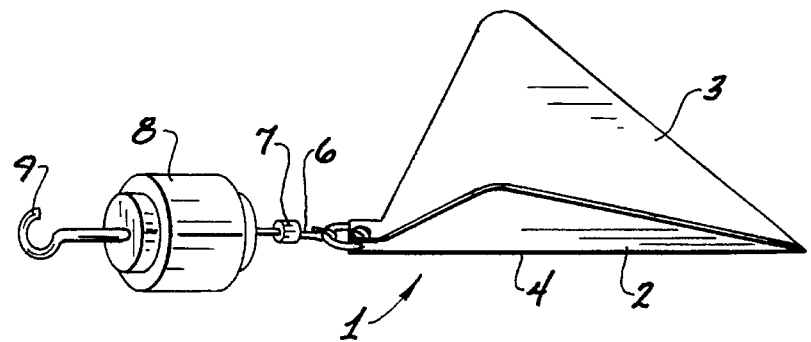
FIG. 6 is a side inside perspective view of the wind detector of this invention having the winged sections facing upwardly.
Figure 7:
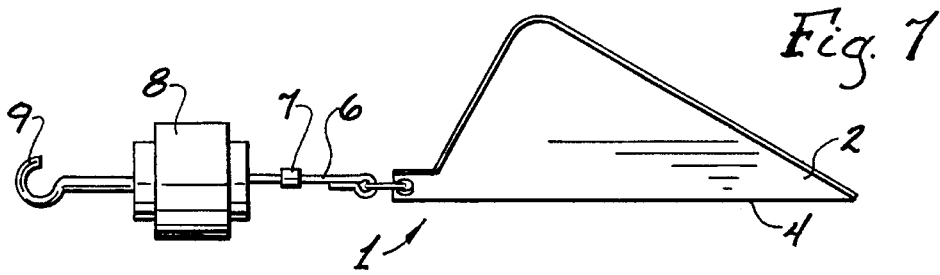
FIG. 7 is a side outside plan view of the wind detector of this invention having the winged sections facing upwardly.
Figure 8:
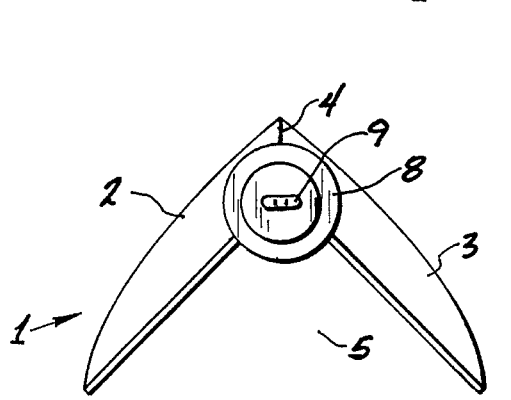
FIG. 8 is a plan top view of the detector of this invention.
Figure 9:
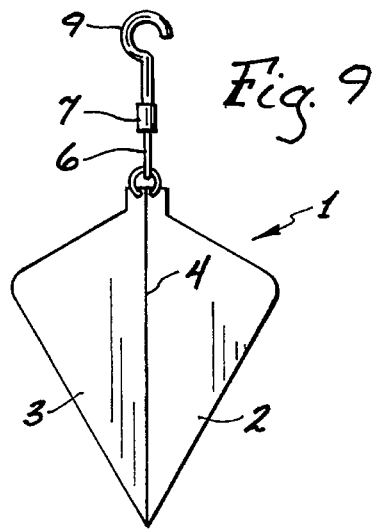
FIG. 9 is a front outside plan view of the wind detector of this invention without the scent compartment.

In FIG. 1 the wind detector 1 of this invention is shown from a front view with a main section comprising the wing sections 2 and 3 separated by a fold 4. The wing sections 2 and 3 are substantially triangular in configuration and form a V-shape when looking downwardly as in FIG. 8. The fold 4 forms an outside surface point having the wings 2 and 3 project backwardly therefrom. This folded configuration forms the outside pointed surface as shown in FIG. 1 and the resulting inside scoop-like surface 5 as shown in FIGS. 2, 3 and 4. As the wind blows, it is captured in scoop section 5 which orients the vane accordingly. The winged sections 2 and 3 are suspended or rotatably secured to a wire or cord 6 and are free to turn upon wind contact. The cavity or scoop section 5 catches the wind current and because of the free suspension from cord or suspension means 6 will easily turn; ie. will orient to the direction of the wind. This permits an immediate visual determination of the wind direction. The wing sections 2 and 3 are connected together at fold 4 to form an acute inner angle as can be seen in FIG. 8. This acute inner angle with the inner sections of wings 2 and 3 forms the scoop section 5 which catches the wind and orients the wind detector 1 accordingly. Swivel 7 is located above the wings 2 and 3 and permits the wind detector 1 to move freely when air current comes in contact therewith. While it is preferred that a swivel be part of the wind detector of this invention, a unit omitting a swivel is within the scope of this invention. Thus the scent container 8 can be directly attached to the suspinsion means 6. A preferred swivel has ball bearings, but any suitable swivel will function. Appropriate swivels are noted above. Above the swivel 7 is scent container or compartment 8 which is vented by holes and contains an absorbent material which will hold a scented composition such as above noted. Also any scent disclosed in the above listed prior art patents may be used. The scent has two functions; first, it masks the scent of the hunter, and, secondly, it emits a lure or an attracting scent to the deer or other animal being hunted. These lure scents can be obtained from any of the above listed suppliers or companies. The wind detector 1 therefore provides a dual function; to indicate wind direction and to supply a scent attractive to the animal. At the upper terminal end of the wind detector is an attaching means 9 such as a simple ring, an alligator clip, a hook or any other suitable means. The wing shaped or main section of detector 1 comprising wings 2 and 3 can be made of thin, light strip material such as very fine metal such as aluminum, plastic, paper or any other suitable composition. In FIGS. 2, 3, 5, 6, and 7 the wind detector 1 is shown from the side, it has a somewhat triangular shape when viewed from a side perspective. The upper corners of wings 2 and 3 are preferably rounded. In FIG. 4 the inner view of the wind detector is shown, that is the view looking into the scoop section 5. In FIG. 8 a top view of the wind detector is shown again, looking into the interior or scoop section 5 from the top of the structure. In FIG. 9 the same construction as above described is used, however, without the scent compartment 8.

All of the materials used are lightweight, inexpensive components that are readily available. The size of the wind detector 1 can vary; however, it is preferred to make it small enough to fit into the hunter's pocket.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention. For example, one can use the device of this invention without the scent compartment if it is desirable.

What is claimed is:

1. A wind detector comprising a fully movable main body, a suspension means for rotatably suspending said main body, and an attachment means for connecting said wind detector to a supporting structure, said main body comprising a substantially triangular portion having an upper wide section tapering down to a pointed section an having a centrally disposed fold extending from said wide section to said pointed section which defines wing sections on either side thereof, said main body folded inwardly so as to form a scoop section, said scoop section being sensitive to wind current, said suspension means having swivel means to allow said main body to easily turn upon wind contact with said main body, said swivel means is affixed to said main body at said wide section, said suspension means terminating at an upper end with said attachment means.

2. A dual function wind detector comprising a main section, a suspension means for rotatably suspending said main section, a scent container means or a scent compartment, and an attachment means for connecting said wind detector to a supportive structure, said main section comprising a substantially triangular portion having a centrally-disposed fold which defines wing sections on either side thereo,f said main section folded inwardly so as to form a scoop section, said scoop section being sensitive to wind current, said scent compartment located above said main section and connected thereto by said suspension means, said scent compartment having means to retain and emit a scent from a composition dispensed therein, said suspension means terminating at an upper end with said scent compartment and said attachment means connecting said scent compartment to the supporting structure, said suspension means having means to allow said main section to easily turn upon wind contact with said main section.

3. The wind detector of claim 2 wherein said means to allow said main section to turn comprises a swivel connected thereto between said scent compartment and said main section.

4. The wind detector of claim 2 wherein said means to retain and emit said scent comprises an absorbent material and apertures in said scent compartment that will vent the scent from an interior portion to the atmosphere.

5. The wind detector of claim 2 wherein said suspension means is a fine wire or cord that is relatively strong and lightweight.

6. The wind detector of claim 2 wherein said main section is constructed from a material selected from the group consisting of a lightweight metal, a paper product, a plastic and mixtures thereof.

7. The wind detector of claim 2 wherein said main section has a configuration resembling a deer hoof.

8. The wind detector of claim 2 wherein said main section has a triangular configuration when viewed from a front or side view.

9. A wind detector comprising means for indicating wind direction having a main section, means for emitting a scent, a means for suspending said main section, and an attachment means for connecting said detector to a supporting structure, said main section which comprises a substantially triangular structure having a fold which substantially bisects said structure to form two winged sections, said winged sections projecting inwardly to form a wind scoop portion, said main section suspended from and freely rotatable from said suspension means, said means for emitting a scent comprising a scent container or compartment attached to said suspension means at a location above said main section, said attachment means connected to said scent container.

10. The wind detector of claim 9 wherein said suspension means has a swivel connected thereto between said scent compartment and said main section.

11. The wind detector of claim 9 wherein said scent compartment has therein an absorbent material and apertures therein that will vent a scent from an interior portion to the atmosphere.

12. The wind detector of claim 9 wherein said suspension means is a fine wire or cord that is relatively strong and lightweight.

13. The wind detector of claim 9 wherein said main section is constructed from a material selected from the group consisting of a lightweight metal, a paper product, a plastic and mixtures thereof.

14. The wind detector of claim 9 wherein said main section has a configuration resembling a deer hoof.

15. The wind detector of claim 9 wherein said main section has a triangular configuration when viewed from a front or side view.

* * * * *